US012582086B2

(12) United States Patent
Yao et al.

(10) Patent No.: US 12,582,086 B2
(45) Date of Patent: Mar. 24, 2026

(54) LINKAGE-TYPE LITTER BOX

(71) Applicant: Ningbo Singfun Electric Appliance Co., Ltd., Ningbo (CN)

(72) Inventors: Yuchu Yao, Ningbo (CN); Jialei Mao, Ningbo (CN); Zhimin Lin, Ningbo (CN)

(73) Assignee: Ningbo Singfun Electric Appliance Co., Ltd., Ningbo (CN)

( * ) Notice: Subject to any disclaimer, the term of this patent is extended or adjusted under 35 U.S.C. 154(b) by 0 days.

(21) Appl. No.: 19/051,245

(22) Filed: Feb. 12, 2025

(65) Prior Publication Data

US 2025/0176492 A1 Jun. 5, 2025

(30) Foreign Application Priority Data

Jan. 10, 2025 (CN) .......................... 202510045738.8
Jan. 10, 2025 (CN) ........................ 202520066322.X

(51) Int. Cl.
*A01K 1/01* (2006.01)

(52) U.S. Cl.
CPC ................................. *A01K 1/0114* (2013.01)

(58) Field of Classification Search
CPC ............................ A01K 1/0114; A01K 1/0116
See application file for complete search history.

(56) References Cited

U.S. PATENT DOCUMENTS

| | | | |
|---|---|---|---|
| 8,109,237 B1* | 2/2012 | Tsengas | A01K 29/00 |
| | | | 119/166 |
| 8,381,687 B2* | 2/2013 | Tsengas | A01K 29/00 |
| | | | 119/166 |
| 2007/0056521 A1* | 3/2007 | Caputa | A01K 1/035 |
| | | | 119/166 |
| 2014/0069343 A1* | 3/2014 | Loveday | A01K 1/01 |
| 2015/0173323 A1* | 6/2015 | Plazarte | A01K 1/01 |

\* cited by examiner

*Primary Examiner* — Joshua J Michener
*Assistant Examiner* — Henry Hooper Mudd
(74) *Attorney, Agent, or Firm* — Sisson & Banyas, Attorneys at Law, LLC; Edwin A. Sisson

(57) ABSTRACT

A linkage-type litter box comprises a box body, a filter shovel, a driving mechanism and a linkage member. A cavity is provided inside the box body, and the filter shovel is arranged inside the cavity. The driving mechanism is arranged on the box body and connected to the linkage member. The linkage member is connected to the filter shovel to drive the filter shovel to rotate and reciprocate.

11 Claims, 7 Drawing Sheets

LINKAGE-TYPE LITTER BOX

PRIORITIES AND CROSS REFERENCES

This application claims priority from Chinese Application No. 2025100457388 filed on 10 Jan. 2025 and Chinese Application No. 202520066322X filed on 10 Jan. 2025, the teachings of each of which are incorporated by reference herein in their entirety.

TECHNICAL FIELD

The present application relates to a linkage-type litter box and is suitable for the technical field of devices for pets.

BACKGROUND

With the increasing demand for feeding pets, litter boxes gradually emerge. However, the existing litter boxes still have some problems, such as complex structure, uneven stress of the filter shovel during movement and sweeping, resulting in poor litter sweeping effect. In the prior art, the turning of the filter shovel is generally realized by a rotating arm alone, and the forward and backward movement of the filter shovel is realized by a movement of a moving mechanism and a separating lever on the litter box, so that the structure is complex. Moreover, the movement of the moving mechanism on the litter box will easily lead to the uneven distribution of stress at the left and right ends of the filter shovel, so that the coordinated synchronous movement cannot be realized and the filter shovel will be stuck.

SUMMARY

The objective of the present application is to design a linkage-type litter box to solve the problem of uneven stress on the filter shovel in the existing litter box structures during movement.

The present application relates to a linkage-type litter box, wherein the litter box includes a box body, a filter shovel, a driving mechanism and a linkage member; a cavity is provided inside the box body, and the filter shovel is arranged inside the cavity; the driving mechanism is arranged on the box body and connected to the linkage member; and, the linkage member is connected to the filter shovel to drive the filter shovel to rotate and reciprocate.

In some embodiments, the driving mechanism includes a first driving mechanism and a second driving mechanism; the first driving mechanism is arranged on one side of the box body, and the first driving mechanism is connected to the linkage member to drive the filter shovel to rotate; and, the second driving mechanism is arranged on the other side of the box body, and the second driving mechanism is connected to the linkage member to drive the filter shovel to reciprocate.

In some embodiments, the linkage member includes a synchronizing shaft and a bushing; the synchronizing shaft is arranged in the bushing, or the bushing is arranged in the synchronizing shaft; the bushing is connected to the filter shovel to drive the filter shovel to rotate, and the first driving mechanism is connected to the bushing through a connecting member to drive the bushing to rotate; and, the synchronizing shaft is connected to the filter shovel to drive the filter shovel to reciprocate, and the second driving mechanism is connected to the synchronizing shaft through a transmission pair to drive the synchronizing shaft to reciprocate.

In some embodiments, the first driving mechanism includes a first motor, an arc-shaped toothed disc and a first moving member; the first moving member is arranged on one side of the box body in a horizontal direction in a sliding manner; the arc-shaped toothed disc is fixedly arranged on the first moving member; one end of the connecting member is connected to the first motor, while the other end thereof is connected to the bushing; and, an output end of the first motor is in transmission fit with the arc-shaped toothed disc through a rotary gear.

In some embodiments, the second driving mechanism includes a second motor and a second moving member; the second moving member is arranged on the other side of the box body in the horizontal direction in a sliding manner, and the second motor is arranged on the second moving member; a first rack is arranged on one side of the box body in the horizontal direction, and a second rack is arranged on the other side of the box body in the horizontal direction; an output end of the second motor is connected to the synchronizing shaft, and one end of the synchronizing shaft is also in transmission connection to the second rack through a second transmission pair; and, the other end of the synchronizing shaft is in transmission connection to the first rack through a first transmission pair.

In some embodiments, a wiring member is arranged between the first driving mechanism and the second driving mechanism, a wire is arranged on the wiring member, and the wire is electrically connected to electrical elements on the first driving mechanism and the second driving mechanism, respectively.

In some embodiments, the wiring member is a wiring tube, and the wire is arranged in the wiring tube; or, the wiring member is a wiring sleeve, and the wire is arranged in the wiring sleeve; or, the wiring member is a wiring rod, and the wire is arranged on the wiring rod.

In some embodiments, guide rails are arranged on both sides of the box body in the horizontal direction, respectively, the first driving mechanism is arranged on the guide rail on one side of the box body in a sliding manner, and the second driving mechanism is arranged on the guide rail on the other side of the box body in a sliding manner.

In some embodiments, the litter box further includes an enclosure which can be arranged in a circumferential direction of the cavity in a detachable manner.

In some embodiments, the filter shovel can be arranged on the linkage member in a detachable manner.

In some embodiments, the litter box further a feces collecting cabin which can be arranged on the box body in a detachable manner.

The linkage-type litter box provided by the present application has the following technical advantages:

(1) By designing a linkage member to coordinate with the driving mechanism and the filter shovel respectively to realize the rotation and movement of the filter shovel, the stress on both ends of the filter shovel is more even, the litter sweeping effect is better, and the product experience is improved.

(2) By designing the first driving mechanism and the second driving mechanism on both sides of the box body respectively, the weight of both sides of the box body is balanced, and the driving stress on the whole filter shovel is more even.

(3) By designing a wiring member between the first driving mechanism and the second driving mechanism to distribute wires, the distribution of wires of different driving mechanisms is realized, and the wires are protected from being damaged.

(4) Structures such as a separating lever are not provided in the present application, so the structure of the litter box can be simplified, the size of the litter box can be reduced, and the cost can be reduced.

in which: 1: box body; 11: box bottom; 12: guide rail; 2: feces collecting cabin; 3: enclosure; 4: first driving mechanism; 41: first rack; 42: driven gear; 43: first transmission gear; 44: second transmission gear; 45: first motor; 46: arc-shaped toothed disc; 47: moving member; 48: connecting rod; 5: second driving mechanism; 51: second rack; 52: driving gear; 53: first drive gear; 54: second driving gear; 55: second motor; 6: filter shovel; 7: synchronizing shaft; 8: bushing; 9: wiring tube; and, 10: wire.

DETAILED DESCRIPTION

To make the objectives, technical solutions and advantages of the present application clearer, the embodiments of the present application will be described below in detail with reference to the accompanying drawings. It is to be noted that the embodiments in the present application and the features in the embodiments can be arbitrarily combined with each other if not conflicted.

Figure 1:
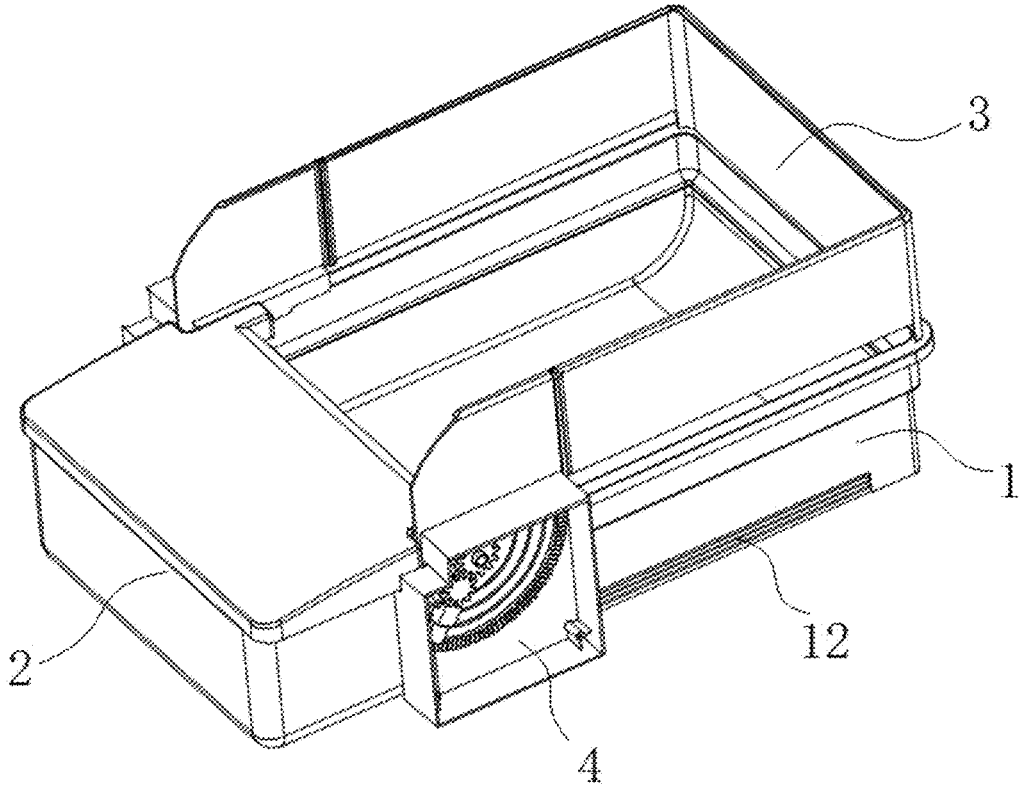
FIG. 1 is a first schematic diagram of the linkage-type litter box according to the present application.
Figure 2:
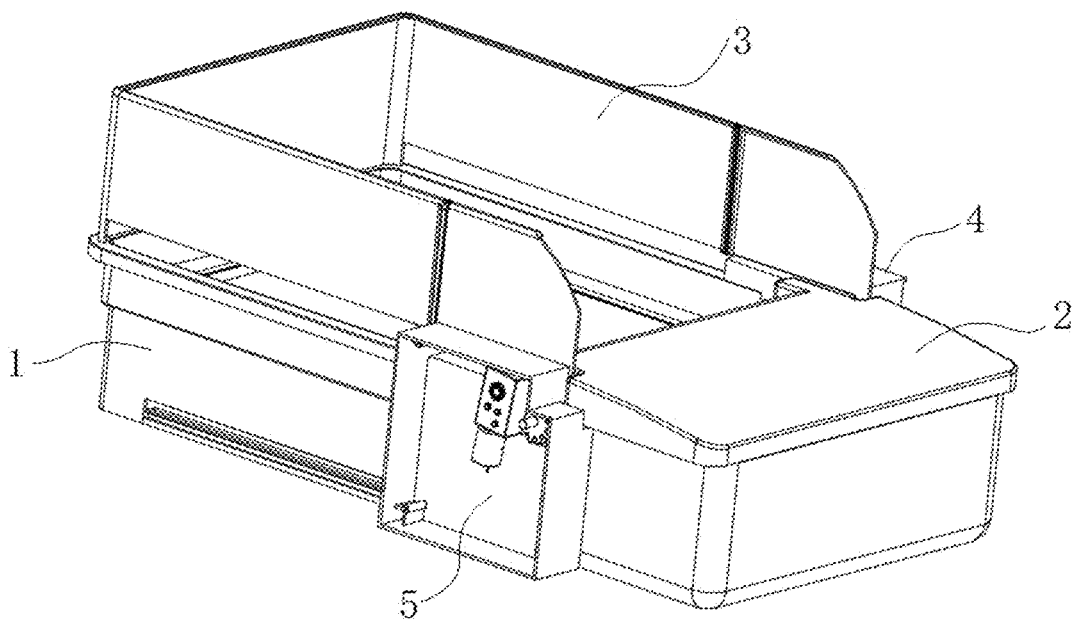
FIG. 2 is a second schematic diagram of the linkage-type litter box according to the present application.
Figure 3:
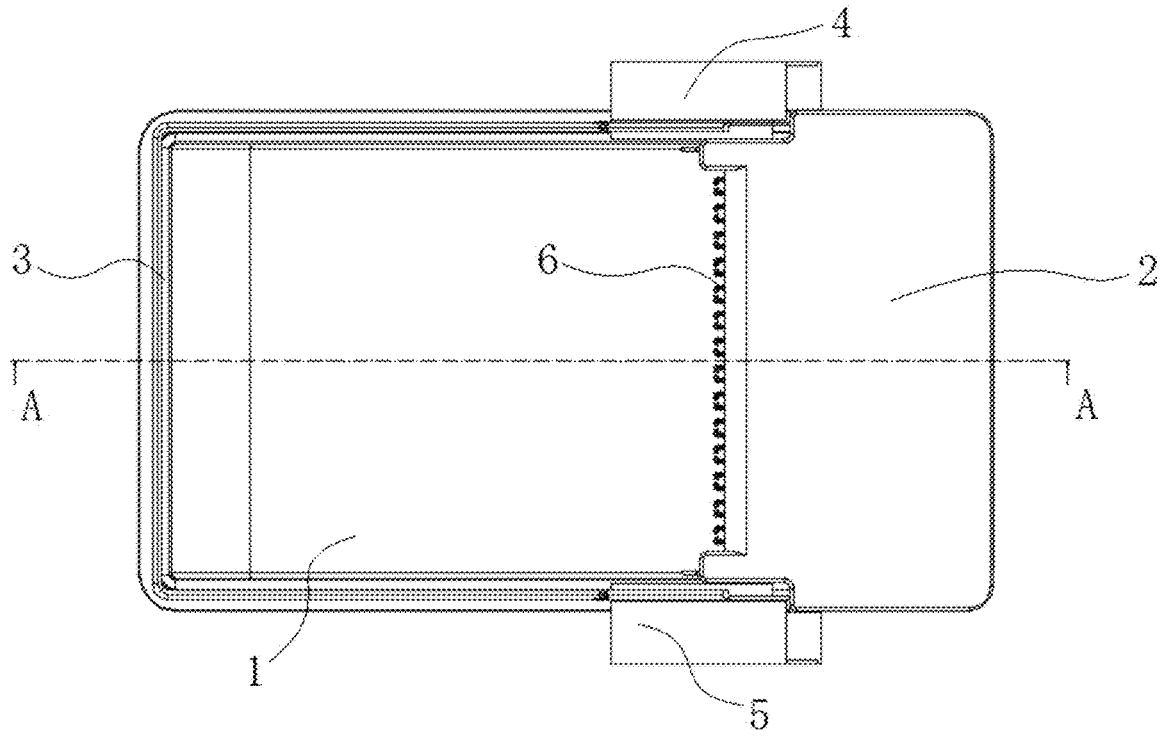
FIG. 3 is a top view of the linkage-type litter box according to the present application.

As shown in FIGS. 1-3, the present application provides a linkage-type litter box. The litter box includes a box body 1, a filter shovel 6, a driving mechanism and a linkage member. A cavity is provided inside the box body 1, so that a cat can shit in the cavity. The filter shovel 6 can be arranged in the cavity in a rotatable manner, and can filter and sweep caked feces in the cavity. Further, the linkage member is an integral structure, and the linkage member is arranged on the box body 1 in the left-right direction of the box body 1 and can move on the box body 1 to drive the filter shovel 6 to perform a sweeping operation. Further, the driving mechanism is arranged on the box body 1 and connected to the linkage member to drive the linkage member to rotate. Further, the linkage member is connected to the filter shovel 6 to drive the filter shovel 6 to rotate and reciprocate. That is, the linkage member can drive the filter shovel 6 to rotate, and can also drive the filter shovel 6 to reciprocate, and balance the movement of both ends of the filter shovel 6. In the litter box provided by the present application, by designing a linkage member to coordinate with the filter shovel to drive the rotation and movement of the filter shovel in the cavity, the caked feces in the cavity can be swept. Moreover, the stress at both ends of the filter shovel is more even, the litter sweeping effect is better, the size of the litter box can be reduced, and the product experience can be improved.

As shown in FIGS. 2, 3, 7 and 8, in some implementations, the driving mechanism includes a first driving mechanism 4 and a second driving mechanism 5, wherein the first driving mechanism 4 is arranged on one side of the box body 1 and can reciprocate in the horizontal front-back direction on one side of the box body 1. Specifically, the first driving mechanism 4 is connected to the linkage member to drive the filter shovel 6 to rotate about the horizontal axis in the cavity, thereby realizing filtering and sweeping. Further, the second driving mechanism 5 is arranged on the other side of the box body 1 and can reciprocate in the horizontal front-back direction on the other side of the box body 1. Specifically, the second driving mechanism 5 is connected to the linkage member to drive the filter shovel 6 to reciprocate in the cavity in the horizontal direction, thereby realizing position adjustment, filtering and sweeping. In the above scheme, by arranging the first driving mechanism 4 and the second driving mechanism on the left and right sides of the box body to drive the rotation and forward and backward movement of the filter shovel 6, the weight and stress on both sides of the box body are balanced, and the driving mechanism can be prevented from shaking due to uneven stress in the driving process. In the litter box designed by the present application, by designing the driving mechanism for driving the forward and backward movement of the filter shovel and the driving mechanism for imitating the manual litter shoveling action on the left and right sides of the box body, the both driving mechanisms realize the manual feces removing process through the combination of a program and a sensor, so that the structure design is more reasonable.

As shown in FIGS. 4, 5, 7, 9 and 11, in some implementations, the linkage member includes a synchronizing shaft 7 and a bushing 8, wherein the synchronizing shaft 7 is arranged in the bushing 8, or the bushing 8 is arranged in the synchronizing shaft 7. The synchronizing shaft 7 and the bushing 8 are arranged coaxially to realize separate operation and avoid mutual interference. Specifically, the bushing 8 is connected to the filter shovel 6 to drive the filter shovel 6 to rotate about its axis. That is, the filter shovel 6 rotates along with the bushing 8 to realize the litter shoveling action. Further, the first driving mechanism 4 is connected to the bushing 8 through a connecting member 48 to drive the bushing 8 to rotate. Further, the synchronizing shaft 7 is connected to the filter shovel 6 to drive the filter shovel 6 to move. Specifically, the second driving mechanism 5 is connected to the synchronizing shaft 7 through a transmission pair to drive the synchronizing shaft 7 to reciprocate, thereby realizing forward and backward movement. In the linkage member provided by the present application, the synchronizing shaft 7 and the bushing 8 are designed to be sleeved with each other to form an integral structure, the synchronizing shaft 7 is driven by the second driving mechanism 5 to realize the forward and backward movement of the filter shovel 6, and the bushing 8 is driven by the first driving mechanism 4 to realize the rotation of the filter shovel 6, so that the forward and backward movement and the rotation can be synchronized to satisfy the cleaning requirements of the litter box, and the structure is more compact.

As shown in FIGS. 8, 9, 10 and 12, in some implementations, the first driving mechanism 4 includes a first motor 45, an arc-shaped toothed disc 46 and a moving member 47, wherein the moving member 47 of the first driving mechanism 4 is a first moving member, and the first moving member is arranged on one side of the box body 1 in the horizontal direction in a sliding manner to realize the forward and backward movement. The arc-shaped toothed disc 46 is fixedly arranged on the first moving member and can move with the first moving member. Further, one end of the connecting member 48 is connected to the first motor 45, while the other end thereof is connected to the bushing 8, thereby forming a linkage structure. Further, an output end of the first motor 45 is in transmission fit with the arc-shaped toothed disc 46 through a rotary gear. Specifically, the rotary gear is arranged on the output shaft of the first motor 45, and the rotary gear is meshed with the arc-shaped toothed disc 46 and can do circular motion on the arc-shaped toothed disc 46 to drive the filter shovel 6 to rotate, so as to imitate the manual litter shoveling action. The radian of the arc-shaped toothed disc 46 is designed to control the amplitude of the litter shoveling action, so that the best litter shoveling amplitude can be achieved.

Figure 14:
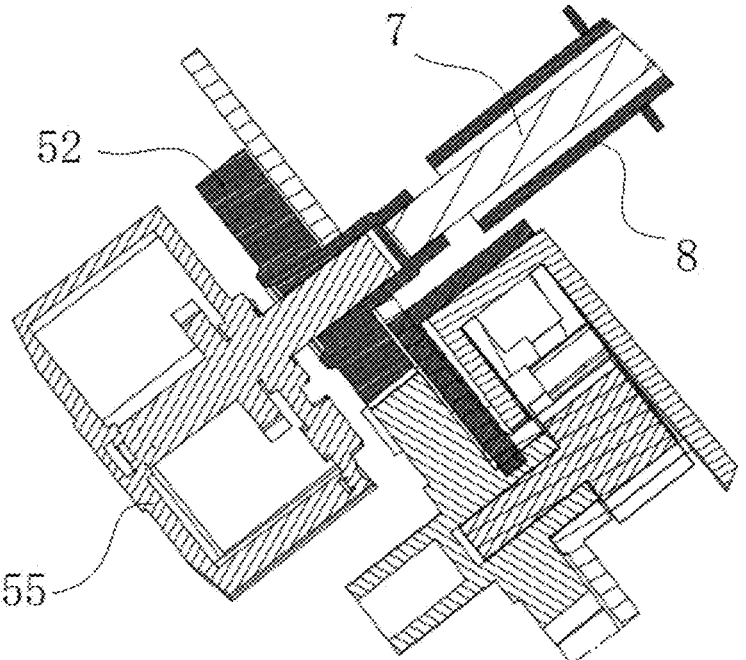
FIG. 14 is an enlarged view of part G in FIG. 13 according to the present application.

As shown in FIGS. 7-8 and 13-14, in some implementations, the second driving mechanism 5 includes a second motor 55 and a second moving member. The second moving member is arranged on the other side of the box body 1 in the horizontal direction in a sliding manner to realize the forward and backward movement. The second motor 55 is arranged on the second moving member, and moves with the second moving member. Further, a first rack 41 is arranged on one side of the box body 1 in the horizontal direction, and a second rack 51 is arranged on the other side of the box body 1 in the horizontal direction; and, an output end of the second motor 55 is connected to one end of the synchronizing shaft 7 to drive the synchronizing shaft 7 to rotate. One end of the synchronizing shaft 7 is in transmission connection to the second rack 51 through a second transmission pair, and the other end thereof is in transmission connection to the first rack 41 through a first transmission pair, thereby realizing synchronous movement. As shown in FIG. 14, the second transmission pair includes a driving gear 52, a first drive gear 53 and a second drive gear 54, wherein the driving gear 52 is fixedly arranged at one end of the synchronizing shaft 7 and meshed with the first drive gear 53; and, the first drive gear 53 is meshed with the second drive gear 54, and the second drive gear 54 is meshed with the second rack 51, thereby realizing driving connection. Correspondingly, the first transmission pair includes a driven gear 42, a first transmission gear 43 and a second transmission gear 44, wherein the driven gear 42 is fixedly arranged at the other end of the synchronizing shaft 7 and meshed with the first transmission gear 43; and, the first transmission gear 43 is meshed with the second transmission gear 44, and the second transmission gear 44 is meshed with the first rack 41, thereby realizing driving connection. Specifically, the second motor 55 drives the second drive gear 54 to move on the second rack 51 through the driving gear 52 and the first drive gear 53, and this movement is transferred to the first transmission pair on the other side by driving the synchronizing shaft 7, so that the forward and backward movements of the power mechanisms on the left and right sides are kept synchronous.

Figure 6:
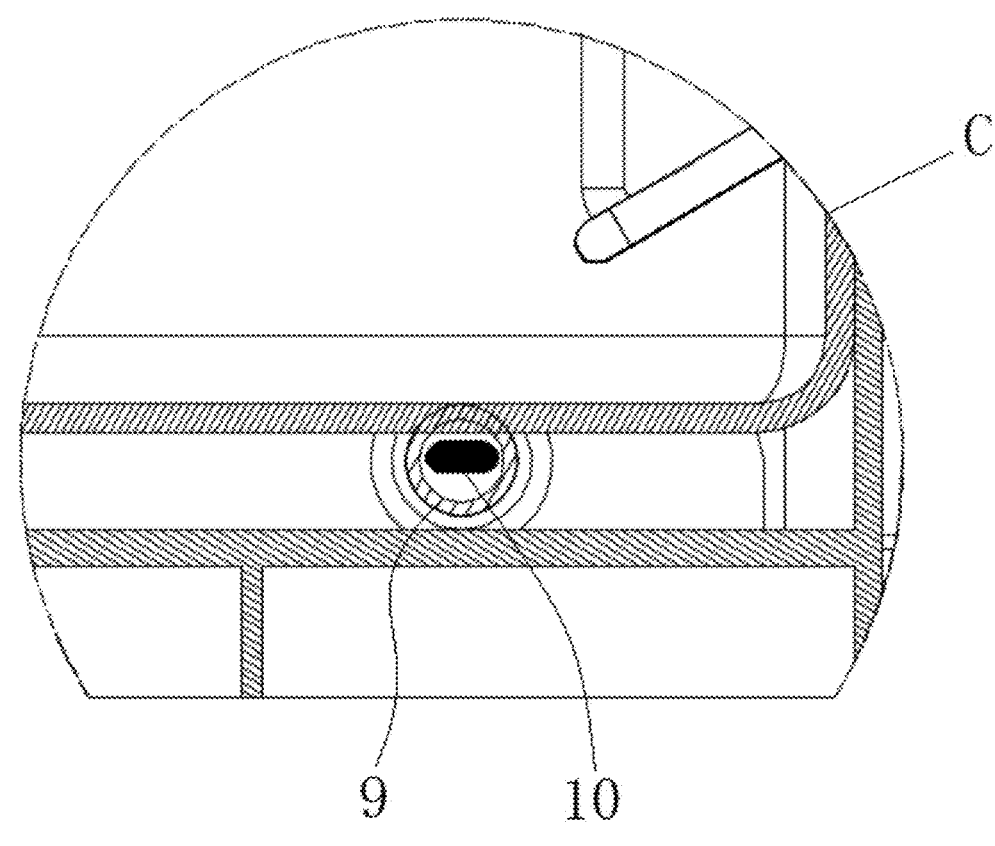
FIG. 6 is an enlarged view of part C in FIG. 4 according to the present application.
Figure 7:
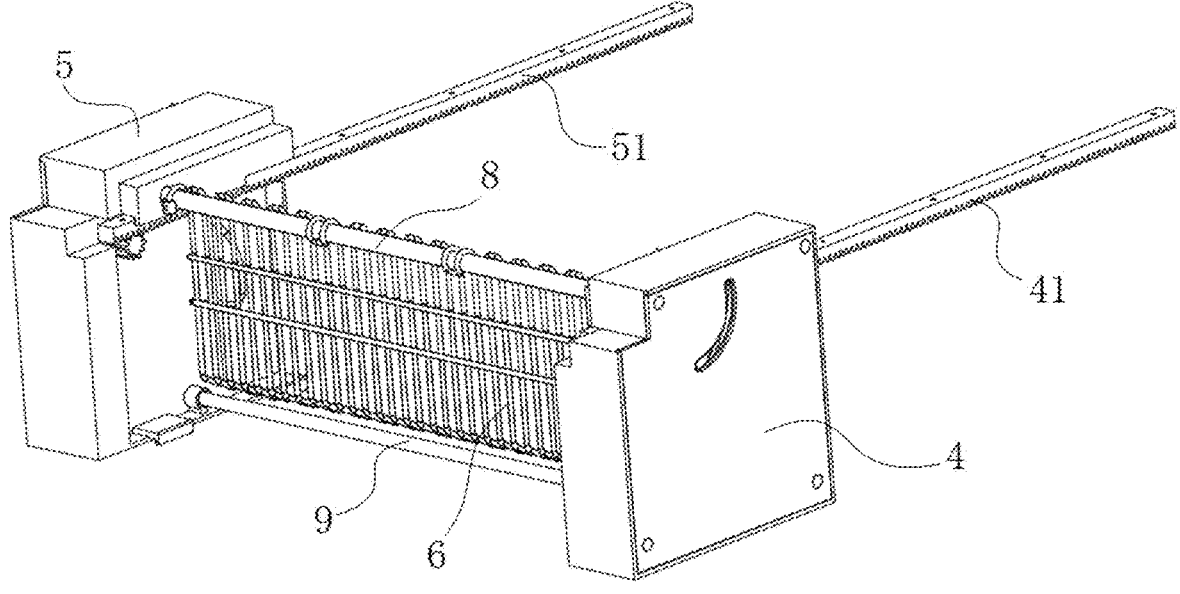
FIG. 7 is a schematic diagram of the coordination of the driving mechanism and the filter shovel according to the present application.
Figure 8:
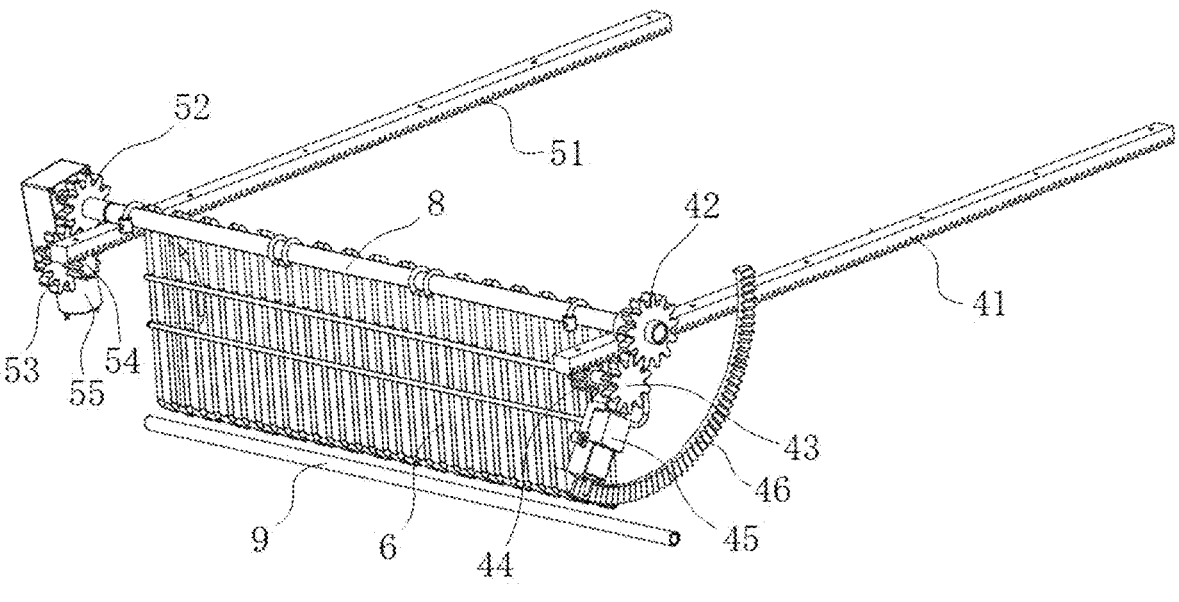
FIG. 8 is an internal schematic diagram of the coordination of the driving mechanism and the filter shovel according to the present application.

As shown in FIGS. 6-8, in some implementations, a wiring member is arranged between the first driving mechanism 4 and the second driving mechanism 5, a wire 10 is arranged on the wiring member, and the wire is electrically connected to electrical elements on the first driving mechanism 4 and the second driving mechanism 5, respectively, thereby realizing power supply. Specifically, the wiring member is arranged on the bottom of the first driving mechanism 4 and the second driving mechanism 5, and moves forward and backward along with the first driving mechanism 4 and the second driving mechanism 5 so as to protect the wire of the first driving mechanism 4 and the second driving mechanism 5, so that the wire is protected from being damaged during movement.

As shown in FIGS. 6-8, in some implementations, the wiring member can be designed as a wiring tube 9, so that the wire 10 can be arranged in the wiring tube 9 for protection. Or, the wiring member can be designed as a wiring sleeve, and the wire 10 is arranged in the wiring sleeve. Thus, the protection effect can also be achieved. Or, the wiring member can be designed as a wiring rod, and the wire 10 is attached to the wiring rod, thereby achieving the traction and protection effects.

Figure 4:
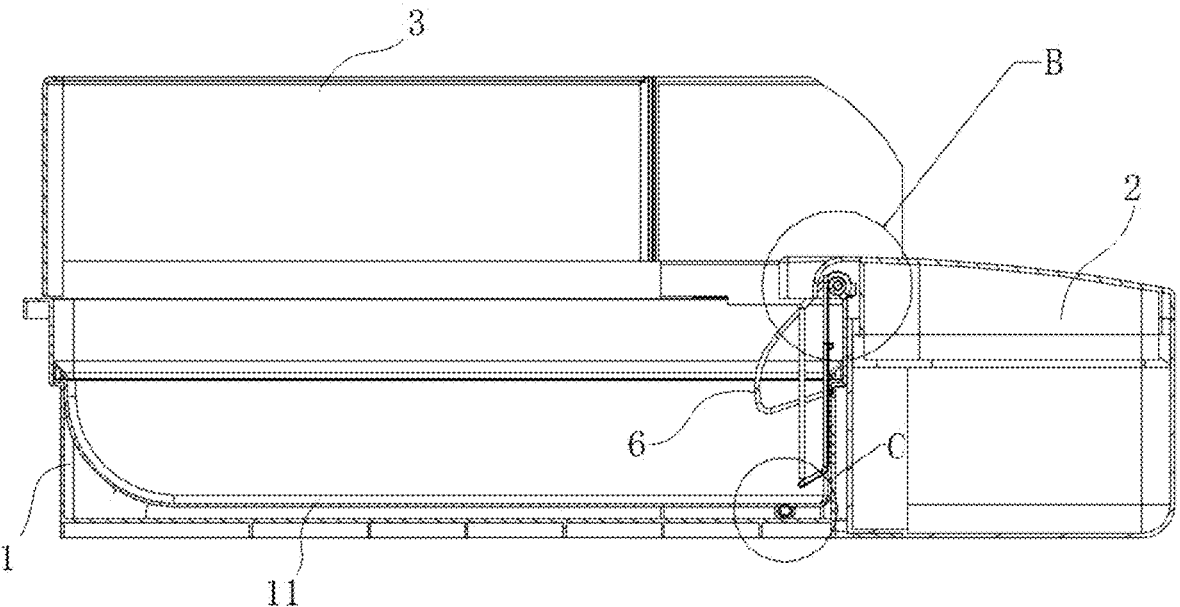
FIG. 4 is a sectional view of FIG. 3 in the A-A direction according to the present application.
Figure 5:
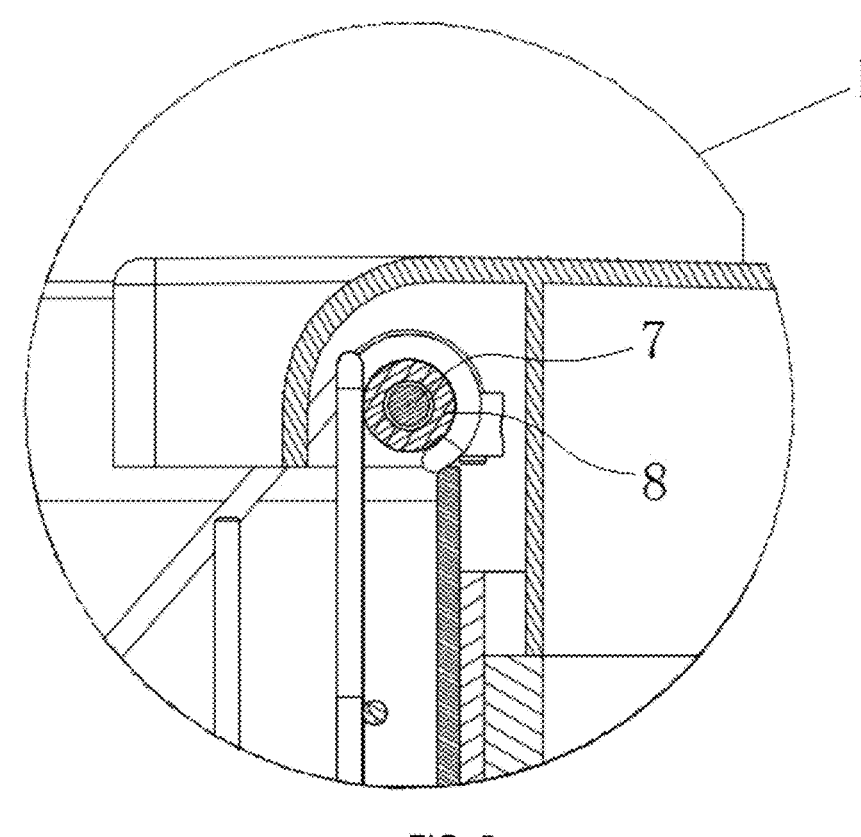
FIG. 5 is an enlarged view of part B in FIG. 4 according to the present application.
Figure 10:
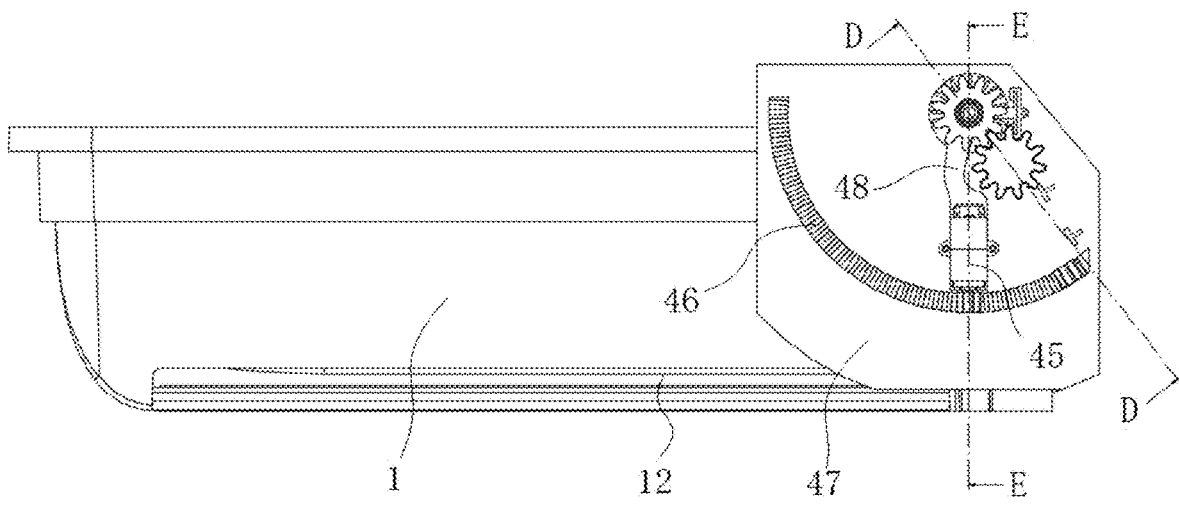
FIG. 10 is a second local view of the linkage-type litter box according to the present application.
Figure 11:
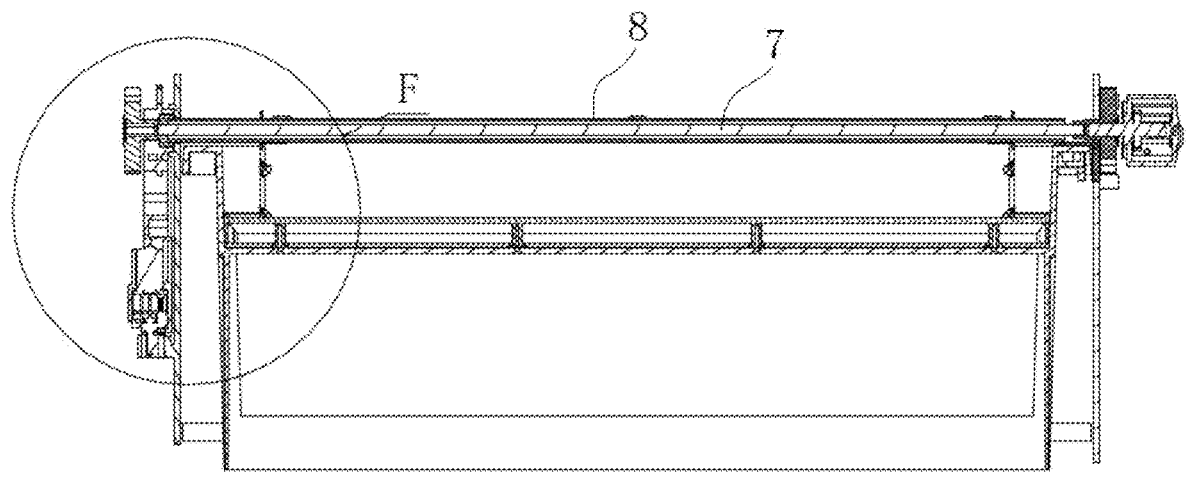
FIG. 11 is a sectional view of FIG. 10 in the E-E direction according to the present application.
Figure 12:
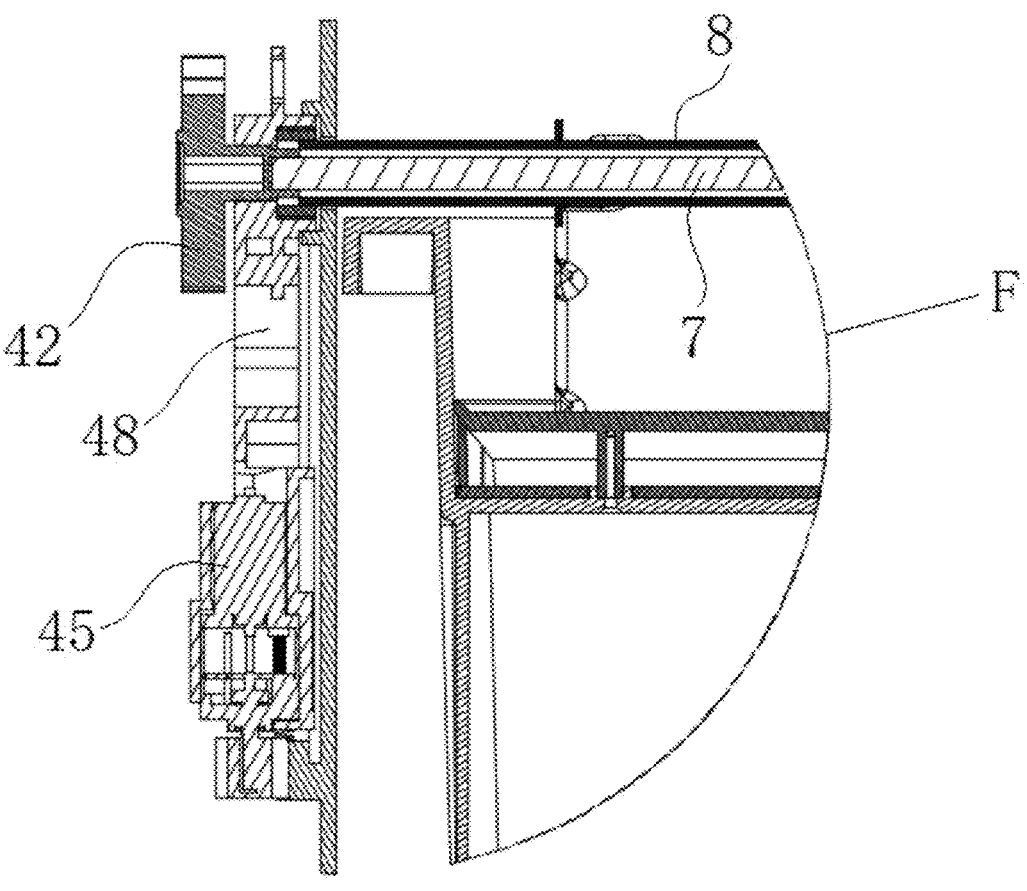
FIG. 12 is an enlarged view of part F in FIG. 11 according to the present application.
Figure 13:
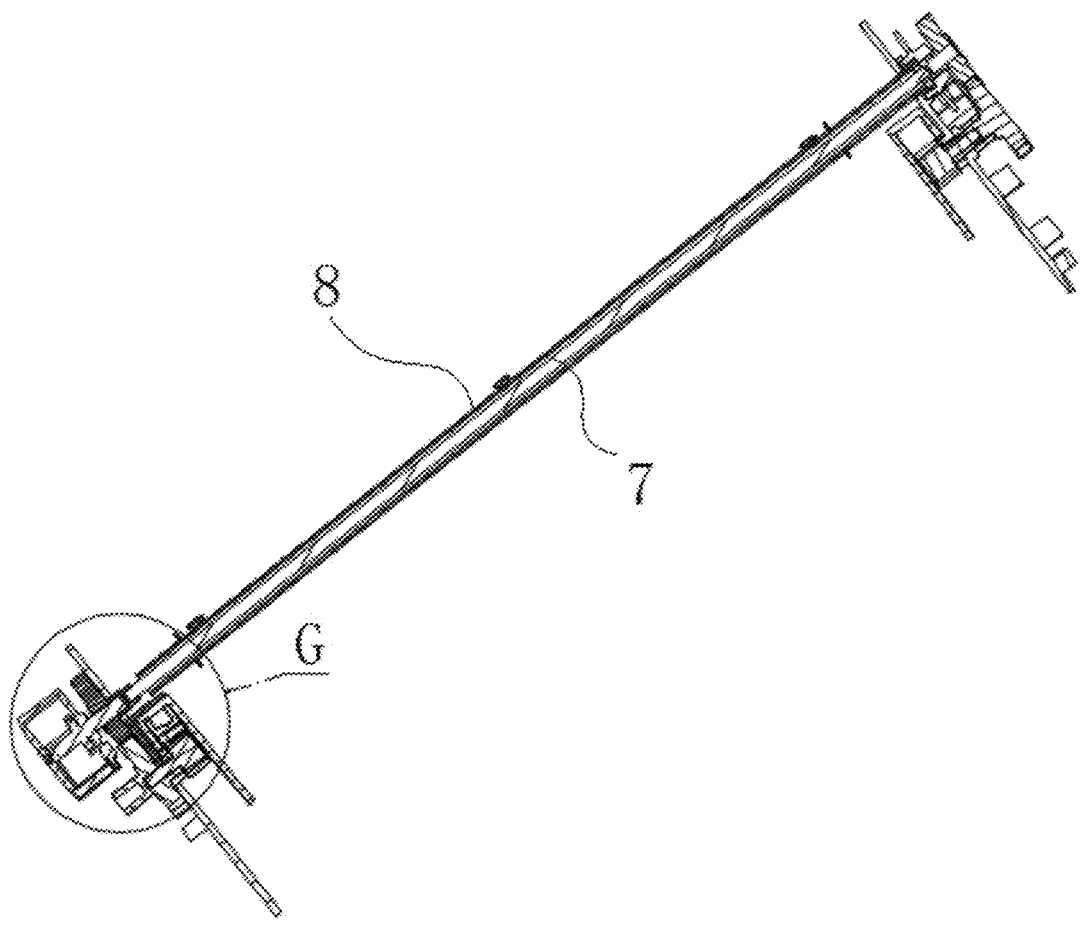
FIG. 13 is a sectional view of FIG. 10 in the D-D direction according to the present application.

As shown in FIGS. 3, 4 and 10, in some implementations, the box body 1 of the present application includes two parts, i.e., a main box structure and a box bottom 11. The main box structure acts as a support and power mechanism as a whole. The box bottom 11 is used to prevent feces from sticking and prevent a cat from hurting its paws and leaving scratches that are easy to hide dirt when the cat climbs the litter. Further, guide rails 12 are arranged on both sides of the box body 1 in the horizontal direction, respectively. Specifically, the first driving mechanism 4 is arranged on the guide rail 12 on one side of the box body 1 in a sliding manner, and the second driving mechanism 5 is arranged on the guide rail 12 on the other side of the box body 1 in a sliding manner and synchronously moves with the first driving mechanism 4.

Figure 9:
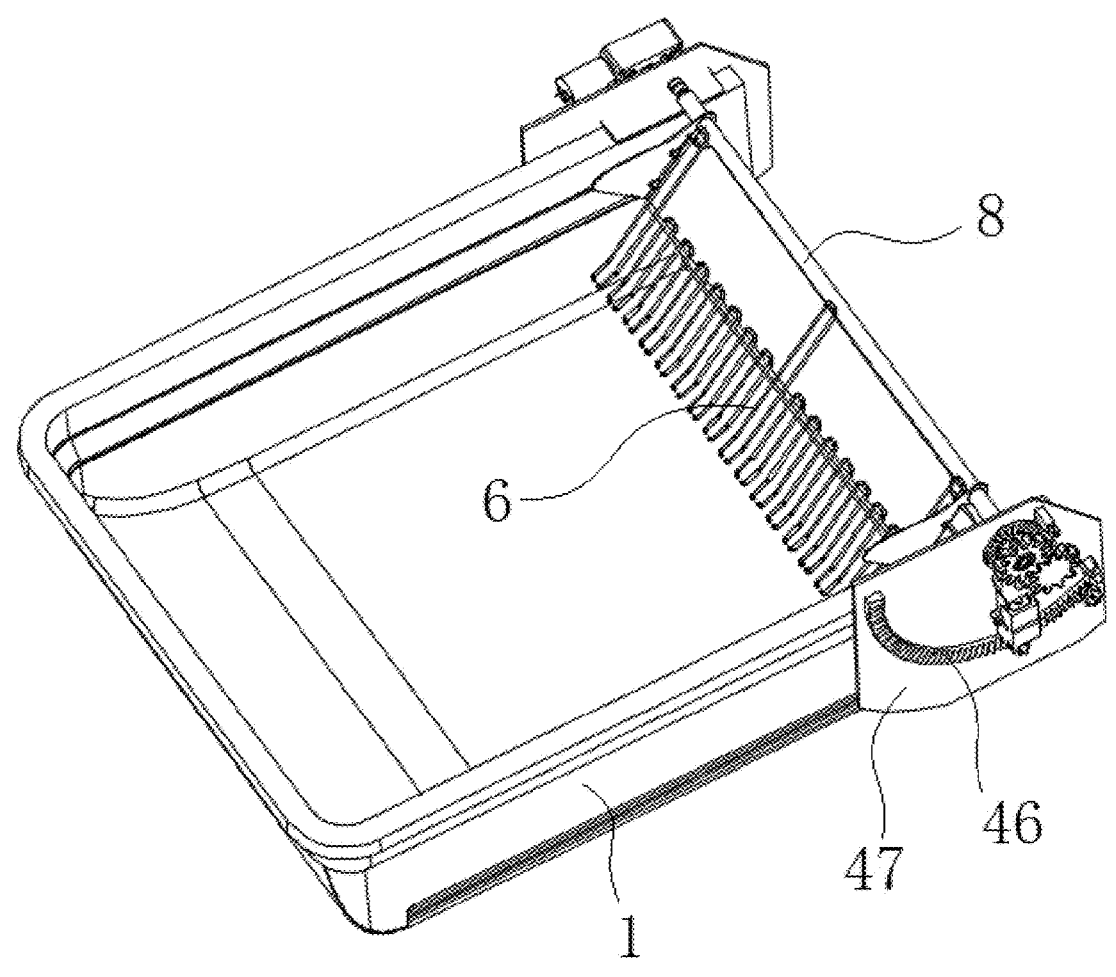
FIG. 9 is a first local view of the linkage-type litter box according to the present application.

As shown in FIGS. 1-3, in some implementations, the litter box provided by the present application further includes an enclosure 3. The enclosure 3 can be arranged in a circumferential direction of the cavity in a detachable manner, and is used to prevent the litter from splashing out of the cavity when the cat climbs the litter. As shown in FIGS. 7-9, in some implementations, the filter shovel 6 can be arranged on the linkage member in a detachable manner, specifically on the synchronizing shaft 7 or the sleeve 8, so that the filter shovel 6 can be replaced and it is convenient for cleaning.

As shown in FIGS. 1-3, in some implementations, the litter box provided by the present application further includes a feces collecting cabin 2. The feces collecting cabin 2 can be arranged on the box body 1 in a detachable manner and located on one side of the cavity, so that the caked feces swept by the filter shovel 6 can fall into the feces collecting cabin 2 and thus be collected. Further, a sealing cover is further provided on the feces collecting cabin 2. The feces collecting cabin 2 and the sealing cover are closely fitted to prevent the smell of feces from flowing out, and can be detached and cleaned separately. By designing the feces collecting cabin 2 and the box body 1 separately, the space for storage can be effectively reduced, and it is easier to clean the feces collecting cabin.

In the present application, by designing a linkage member to coordinate with the driving mechanism and the filter shovel to realize the rotation and movement of the filter shovel, the stress at both ends of the filter shovel is more even, the litter sweeping effect is better, and the product experience is improved. By designing the first driving mechanism and the second driving mechanism on both sides of the box body respectively, the weight of both sides of the box body is balanced, and the stress on the whole filter shovel is more even. By designing a wiring member between the first driving mechanism and the second driving mechanism to distribute wires, the distribution of wires of different driving mechanisms is realized, and the wires are protected from being damaged. Structures such as a separating lever are not provided in the present application, so the structure of the litter box can be simplified, the size of the litter box can be reduced, and the cost can be reduced.

Although the implementations disclosed in the present application have been described above, the described contents are only implementations used for understanding the present application and not intended to limit the present application. Without departing from the spirit and scope disclosed in the present application, any person skilled in the art to which the present application belongs can make any modifications and alterations to the forms and details of implementation. However, the protection scope of the present application shall still be subject to the scope defined by the appended claims.

The invention claimed is:

1. A linkage-type litter box, wherein the litter box comprises a box body (1), a filter shovel (6), a driving mechanism and a linkage member; a cavity is provided inside the box body (1), and the filter shovel (6) is arranged inside the cavity; the driving mechanism is arranged on the box body (1) and connected to the linkage member; the linkage member is connected to the filter shovel (6) to drive the filter shovel (6) to rotate and reciprocate;

wherein the driving mechanism comprises a first driving mechanism (4) and a second driving mechanism (5);

the first driving mechanism (4) is arranged on one side of the box body (1), and the first driving mechanism (4) is connected to the linkage member to drive the filter shovel (6) to rotate;

the second driving mechanism (5) is arranged on the other side of the box body (1), and the second driving mechanism (5) is connected to the linkage member to drive the filter shovel (6) to reciprocate;

wherein the linkage member comprises a synchronizing shaft (7) and a bushing (8); the synchronizing shaft (7) is arranged in the bushing (8); or, the bushing (8) is arranged in the synchronizing shaft (7);

wherein the bushing (8) is connected to the filter shovel (6) to drive the filter shovel (6) to rotate, and the first driving mechanism (4) is connected to the bushing (8) through a connecting member (48) to drive the bushing (8) to rotate;

the synchronizing shaft (7) is connected to the filter shovel (6) to drive the filter shovel (6) to move, and the second driving mechanism (5) is connected to the synchronizing shaft (7) through a transmission pair to drive the synchronizing shaft (7) to reciprocate.

2. The linkage-type litter box according to claim 1, wherein the first driving mechanism (4) comprises a first motor (45), an arc-shaped toothed disc (46) and a first moving member; the first moving member is arranged on one side of the box body (1) in a horizontal direction in a sliding manner; the arc-shaped toothed disc (46) is fixedly arranged on the first moving member; one end of the connecting member (48) is connected to the first motor (45), while the other end thereof is connected to the bushing (8); and, an output end of the first motor (45) is in transmission fit with the arc-shaped toothed disc (46) through a rotary gear.

3. The linkage-type litter box according to claim 1, wherein the second driving mechanism (5) comprises a second motor (55) and a second moving member; the second moving member is arranged on the other side of the box body (1) in the horizontal direction in a sliding manner, and the second motor (55) is arranged on the second moving member; a first rack (41) is arranged on one side of the box body (1) in the horizontal direction, and a second rack (51) is arranged on the other side of the box body (1) in the horizontal direction; an output end of the second motor (55) is connected to the synchronizing shaft (7), and one end of the synchronizing shaft (7) is also in transmission connection to the second rack (51) through a second transmission pair; and, the other end of the synchronizing shaft (7) is in transmission connection to the first rack (41) through a first transmission pair.

4. The linkage-type litter box according to claim 1, wherein a wiring member is arranged between the first driving mechanism (4) and the second driving mechanism (5), a wire (10) is arranged on the wiring member, and the wire (10) is electrically connected to electrical elements on the first driving mechanism (4) and the second driving mechanism (5), respectively.

5. The linkage-type litter box according to claim 4, wherein the wiring member is a wiring tube (9), and the wire (10) is arranged in the wiring tube (9); or, the wiring member is a wiring sleeve, and the wire (10) is arranged in the wiring sleeve; or, the wiring member is a wiring rod, and the wire (10) is arranged on the wiring rod.

6. The linkage-type litter box according to claim 1, wherein guide rails (12) are arranged on both sides of the box body (1) in the horizontal direction, respectively, the first driving mechanism (4) is arranged on the guide rail (12) on one side of the box body (1) in a sliding manner, and the second driving mechanism (5) is arranged on the guide rail (12) on the other side of the box body (1) in a sliding manner.

7. The linkage-type litter box according to claim 2, wherein guide rails (12) are arranged on both sides of the box body (1) in the horizontal direction, respectively, the first driving mechanism (4) is arranged on the guide rail (12) on one side of the box body (1) in a sliding manner, and the second driving mechanism (5) is arranged on the guide rail (12) on the other side of the box body (1) in a sliding manner.

8. The linkage-type litter box according to claim 3, wherein guide rails (12) are arranged on both sides of the box body (1) in the horizontal direction, respectively, the first driving mechanism (4) is arranged on the guide rail (12) on one side of the box body (1) in a sliding manner, and the second driving mechanism (5) is arranged on the guide rail (12) on the other side of the box body (1) in a sliding manner.

9. The linkage-type litter box according to claim 4, wherein guide rails (12) are arranged on both sides of the box body (1) in the horizontal direction, respectively, the first driving mechanism (4) is arranged on the guide rail (12) on one side of the box body (1) in a sliding manner, and the second driving mechanism (5) is arranged on the guide rail (12) on the other side of the box body (1) in a sliding manner.

10. The linkage-type litter box according to claim 2, wherein the second driving mechanism (5) comprises a second motor (55) and a second moving member; the second moving member is arranged on the other side of the box body (1) in the horizontal direction in a sliding manner, and the second motor (55) is arranged on the second moving member; a first rack (41) is arranged on one side of the box body (1) in the horizontal direction, and a second rack (51) is arranged on the other side of the box body (1) in the horizontal direction; an output end of the second motor (55) is connected to the synchronizing shaft (7), and one end of the synchronizing shaft (7) is also in transmission connection to the second rack (51) through a second transmission pair; and, the other end of the synchronizing shaft (7) is in transmission connection to the first rack (41) through a first transmission pair.

11. The linkage-type litter box according to claim 1, wherein the litter box further comprises an enclosure (3) which can be arranged in a circumferential direction of the cavity in a detachable manner; and/or, the litter box further comprises a feces collecting cabin (2) which can be arranged on the box body (1) in a detachable manner.

\* \* \* \* \*